(12) United States Patent
Lindholm et al.

(10) Patent No.: US 10,259,333 B2
(45) Date of Patent: Apr. 16, 2019

(54) MINING MACHINE AND CHARGING STATION COMPRISING REFRIGERATION CIRCUITS

(71) Applicant: SANDVIK MINING AND CONSTRUCTION OY, Tampere (FI)

(72) Inventors: Kari Lindholm, Tampere (FI); Ville Vare, Tampere (FI); Mikko Kouvo, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 579 days.

(21) Appl. No.: 14/933,935

(22) Filed: Nov. 5, 2015

(65) Prior Publication Data

US 2016/0134001 A1 May 12, 2016

(30) Foreign Application Priority Data

Nov. 6, 2014 (EP) .................................... 14192036

(51) Int. Cl.
*B60L 11/18* (2006.01)
*B60L 3/00* (2019.01)
(Continued)

(52) U.S. Cl.
CPC ......... *B60L 11/1824* (2013.01); *B60L 3/0046* (2013.01); *B60L 11/185* (2013.01); *B60L 11/187* (2013.01); *B60L 11/1874* (2013.01); *B60R 16/033* (2013.01); *E21C 1/00* (2013.01); *H01M 10/44* (2013.01); *H01M 10/613* (2015.04); *H01M 10/625* (2015.04); *H01M 10/6569* (2015.04); *H01M 10/66* (2015.04); *H02J 7/0029* (2013.01); *H02J 7/0052* (2013.01); *H02J 7/027* (2013.01); *H02J 7/1453* (2013.01); *H01M 2220/20* (2013.01); *Y02T 10/7005* (2013.01); *Y02T 10/705* (2013.01); *Y02T 10/7072* (2013.01); *Y02T 90/121* (2013.01); *Y02T 90/128* (2013.01); *Y02T 90/14* (2013.01)

(58) Field of Classification Search
CPC ................ B60L 11/187; B60L 11/1874; B60L 11/1824; H01M 10/625; Y02T 90/14; Y02T 90/121
See application file for complete search history.

(56) References Cited

U.S. PATENT DOCUMENTS 5,909,099 A 6/1999 Watanabe et al.
8,037,954 B2 * 10/2011 Taguchi ............. B60H 1/00257
165/10

(Continued)

FOREIGN PATENT DOCUMENTS

DE 102011000573 A1 8/2012
DE 102011082565 A1 3/2013
(Continued)

*Primary Examiner* — Zachary L Kuhfuss
(74) *Attorney, Agent, or Firm* — Corinne R. Gorski

(57) ABSTRACT

A mining machine and a charging station have batteries that may be cooled down by different refrigerant circuits and include a battery for storing electrical energy, a refrigerant circuit for circulating a refrigerant via the battery, and a connection for connecting the refrigerant circuit to a refrigerant circuit of a charging station via a fluid-fluid heat exchanger.

12 Claims, 1 Drawing Sheet

(51) Int. Cl.
*H02J 7/14* (2006.01)
*H01M 10/613* (2014.01)
*H01M 10/66* (2014.01)
*B60R 16/033* (2006.01)
*E21B 3/00* (2006.01)
*H02J 7/00* (2006.01)
*H01M 10/44* (2006.01)
*H01M 10/625* (2014.01)
*H01M 10/6569* (2014.01)
*H02J 7/02* (2016.01)

(56) References Cited

U.S. PATENT DOCUMENTS

| | | | |
|---|---|---|---|
| 8,098,044 B2* | 1/2012 | Taguchi | B60L 11/1816 320/109 |
| 8,174,235 B2* | 5/2012 | Dyer | B60L 11/1809 180/65.21 |
| 8,350,526 B2* | 1/2013 | Dyer | B60L 1/003 320/104 |
| 8,587,253 B2* | 11/2013 | Dyer | B60L 11/1809 180/65.21 |
| 8,955,657 B2* | 2/2015 | Osara | H02J 7/345 191/3 |
| 9,233,618 B2* | 1/2016 | Dyer | B60L 1/003 |
| 9,308,911 B2* | 4/2016 | Kohlberger | B60L 1/003 |
| 9,701,210 B2* | 7/2017 | Woo | B60L 11/1818 |
| 9,786,961 B2* | 10/2017 | Dyer | H01M 10/486 |
| 2009/0256523 A1* | 10/2009 | Taguchi | B60L 11/1816 320/109 |
| 2010/0089669 A1* | 4/2010 | Taguchi | B60H 1/00257 180/65.1 |
| 2012/0043935 A1 | 2/2012 | Dyer et al. | |
| 2012/0043943 A1* | 2/2012 | Dyer | B60L 11/1809 320/137 |
| 2012/0298004 A1* | 11/2012 | Osara | B60L 9/12 102/313 |
| 2013/0026998 A1* | 1/2013 | Dyer | B60L 11/1809 320/150 |
| 2013/0029193 A1 | 1/2013 | Dyer et al. | |
| 2014/0062397 A1* | 3/2014 | Dyer | B60L 1/003 320/109 |
| 2014/0292260 A1* | 10/2014 | Dyer | H02J 7/0027 320/107 |
| 2016/0052421 A1* | 2/2016 | Galamb | B60L 11/1816 165/47 |
| 2016/0156075 A1* | 6/2016 | Lindholm | H01M 10/6568 165/104.21 |
| 2017/0028862 A1* | 2/2017 | Nagel | B60L 11/1818 |
| 2017/0096073 A1* | 4/2017 | Mardall | B60L 11/187 |
| 2018/0013180 A1* | 1/2018 | Dyer | H01M 10/486 |

FOREIGN PATENT DOCUMENTS

| | | | | |
|---|---|---|---|---|
| DE | 102011082566 A1 | | 3/2013 | |
| DE | 102012213855 A1 | * | 2/2014 | ......... H01M 10/443 |
| FR | 2934087 A3 | | 1/2010 | |
| JP | 2012256790 A | | 12/2012 | |
| WO | 2013041387 A1 | | 3/2013 | |

* cited by examiner

MINING MACHINE AND CHARGING STATION COMPRISING REFRIGERATION CIRCUITS

RELATED APPLICATION DATA

This application claims priority under 35 U.S.C. § 119 to EP Patent Application No. 14192036.3, filed on Nov. 6, 2014, which the entirety thereof is incorporated herein by reference.

FIELD OF THE INVENTION

The present disclosure relates to refrigeration of battery, and particularly refrigeration of a battery in a mining machine.

BACKGROUND

A battery for storing electrical energy should be operated in a temperature range that supports a long lifetime of the battery. When a battery is charged electrical energy is stored to the battery for later use. When the energy stored to the battery is used to supply power to an appliance, e.g. an electrical motor, the battery is discharged.

A typical operating temperature for a lithium-ion battery is between 0-45° C. If the temperature exceeds 45° C., the battery may be degraded. When the temperature of the battery is higher than 45° C., electrolytes inside the battery starts to degrade, which may cause pressure inside battery cells. The pressure may accumulate inside the battery and it may be discharged from the battery along with the electrolytes, whereby personnel and equipment nearby the battery may be in danger.

A battery typically used in a mining vehicle may supply an electrical power of 100 kW, when the vehicle is operated. After the battery is discharged it has to be replaced with a new one or charged. During charging of the battery, the vehicle is out of production, whereby its efficiency is decreased. The battery may be charged fast if a significantly higher power, for example 800 kW, is used to charge the battery. However, the high charging power may cause the battery to heat up significantly more than during operation of the mining vehicle and discharging of the battery.

SUMMARY

An aspect of the present disclosure is to provide a mining machine and a charging station having refrigerant circuits so as to alleviate the above disadvantages.

An aspect of the mining machine and charging station according to the present disclosure is that the battery may be cooled down by different refrigerant circuits. A refrigerant circuit providing a suitable cooling power may be used during charging and another refrigerant circuit may be used during operation of the mining machine. This allows dimensioning of the refrigerant circuits according to the need for cooling power that may vary significantly between the charging of the battery and discharging of the battery.

In some embodiments, the battery may be cooled down by a refrigerant circuit having a smaller cooling power, when the battery is not being charged, than a refrigerant circuit used to cool down the battery during charging of the battery.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

In the following the disclosure will be described in greater detail by means of preferred embodiments with reference to the accompanying drawings, in which.

DETAILED DESCRIPTION OF THE INVENTION

Figure 1:
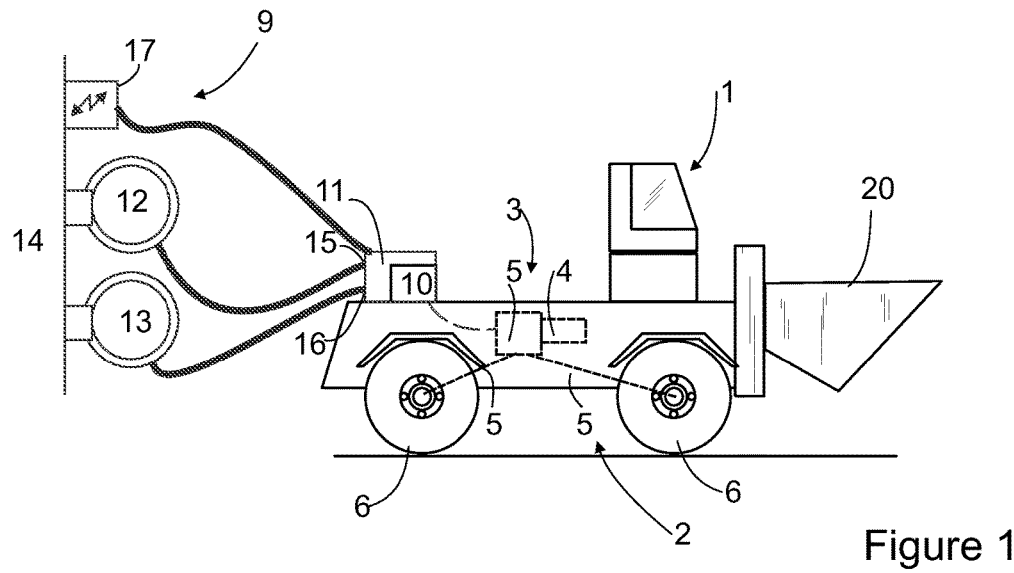
FIG. 1 illustrates an example of a battery powered vehicle, according to an embodiment.

FIG. 1 illustrates an example of a battery powered vehicle 1, according to an embodiment. The battery powered vehicle includes a battery 10. The battery may be capable of storing electrical energy to be supplied to one or more functions of the vehicle. The battery may be enclosed within an encasement for protecting the battery from damage. The electrical energy from the battery may be used to power transportation of goods and/or people by the vehicle. In an embodiment the battery may be lithium-ion battery.

A refrigeration device 11 may be connected to the battery for refrigerating, i.e. cooling, the battery. Preferably, the refrigeration device has a cooling power that is sufficient to refrigerate the battery when the battery is discharged and is supplying electrical power to power operations of the vehicle.

The refrigeration device may have a refrigerant circuit for circulating a refrigerant via the battery and a fluid-fluid heat exchanger connected to the refrigerant circuit. The fluid-fluid heat exchanger is connectable to an external refrigerant circuit for transferring heat between the refrigerant circuit and the external refrigerant circuit. The external refrigerant circuit may be the refrigerant circuit of a charging station 9. Both of the refrigerant circuits have fluid lines that contain a refrigerant that is moved within the fluid lines for transferring heat away from target that is being cooled. The refrigerants of the refrigerant circuits may be selected to provide a sufficient cooling power and they may be the same.

The battery powered vehicle may include a carriage 2 that may be moved by means of drive equipment 3. The drive equipment 3 may have one or more drive motors 4 and one or more power transmission means 5 for transmitting drive power to one or more wheels 6. The drive power transmission may have a mechanical gear system and mechanical power transmission members or, alternatively, a hydraulic or electric drive power system may be used. The drive equipment may be connected to the battery for supplying electricity to the drive equipment from the battery. The connection may include an electrically conductive cable, shown by a dashed line in the FIG. 1, between the battery and the drive equipment. Accordingly, the movement of the vehicle may be powered by electricity from the battery. It should be appreciated that the vehicle may have also other power sources in addition to the battery.

The battery powered vehicle may have a dump 20 and/or a drill for production operations of the vehicle. The productive operations may be mining operations, when the vehicle is a mining machine. The production operations may be powered by the drive equipment. The vehicle can include a water system that is used for or is a part of the drill.

The charging station may be located in an operational area 14 of the vehicle or in a service area of the vehicle. The operational area of the vehicle may be for example a mine. The charging station may include an electrical outlet 17 for charging the battery of the vehicle with electrical energy. The electrical outlet can be connected to the vehicle by at least one electrically conductive cable for charging the battery.

The charging station may further have a connection 12, 13 for connecting a refrigerant circuit of the charging station to a fluid-fluid heat exchanger in the vehicle. The connection may be provided by an inlet connection 12 for feeding refrigerant to the fluid-fluid heat exchanger, and an outlet connection 13 for receiving heated refrigerant from the fluid-fluid heat exchanger. The inlet and outlet connections may be provided by hoses arranged on reels.

The inlet and outlet connections of the charging station may be connected to connectors 15, 16 of the refrigerant circuit 11 of the vehicle for connecting the refrigerant circuit of the charging station to the fluid-fluid heat exchanger. In this way the refrigerant circuit of the charging station may be connected to the vehicle for cooling the battery during charging of the battery. This allows dimensioning the refrigerant circuit of the vehicle for refrigeration of the battery, when the battery is not being charged and less cooling power is needed. When the battery is not being charged, the battery may be discharging. When the battery is discharging, energy stored to the battery may be consumed. The power may be consumed to one or more functions of the vehicle, for example during driving of the vehicle.

The refrigerant circuit of the charging station may be responsible for cooling the battery during charging of the battery. Preferably the refrigerant circuit of the charging station is dimensioned such that it has a higher cooling power than the refrigerant circuit of the vehicle. The dimensioning of the refrigerant circuits considers the amount of fluid flow in fluid lines and/or a type of refrigerant used.

The charging station may be connected to a power source having a larger electrical power than the battery on-board the vehicle. The power source of the charging station may be for example an electrical grid or an electrical generator powered by a combustion engine. In this way, more power is available for refrigeration of the battery during charging of the battery than during discharging of the battery. Since the refrigeration during charging is more efficient than during discharging, the battery may be charged quickly using a high charging power. The charging power may be higher than the power output of the battery, when the battery is discharged. In one example, a mean power output of the battery is 100 kW during operation of the vehicle and the charging power is 800 kW, whereby it is possible to achieve an operating time of two hours for the battery, when the battery is charged for 15 minutes.

During charging the battery via the electrical outlet, refrigerant from the refrigerant circuit of the charging station is circulated via the fluid-fluid heat exchanger of the mining machine.

In an embodiment, the refrigerant circuit of the charging station may be connected to or be a part of a water supply line in a mine. Accordingly, water from the water supply line may serve as the refrigerant in the refrigerant circuit of the charging station. The water may circulate in a water system of the mine. The circulation of the water provides that water heated by the battery may be replaced by cooler water, whereby refrigeration of the charging station provided to batteries that are charged may be maintained even if the charging station would be used continuously.

The battery powered vehicle can be a mining machine 1, for example, a dumper, load haul dump, loader, drilling device, rock drilling rig or any other mining vehicle. The mining vehicle 1 may be equipped with one or more mining work devices, which mining work device may be one or more of the following mining work devices: rock drilling machine, bolting machine, scaling device, injection device, blast hole charger, loading device, bucket, box, measuring device, or drilling, sealing and propellant feeding equipment used in small-charge excavation.

Figure 2A:
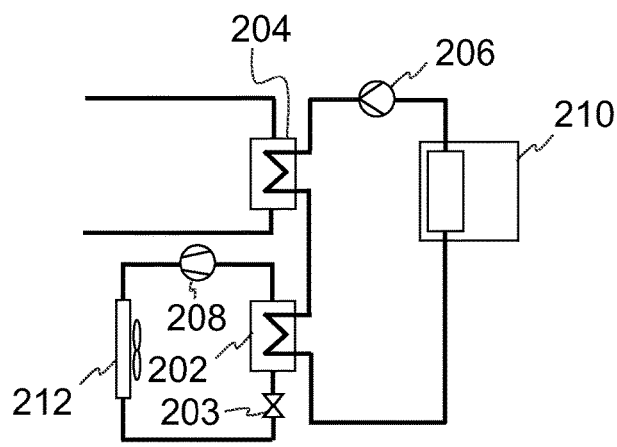
FIGS. 2a and 2b illustrate refrigerant circuits according to embodiments.
Figure 2B:
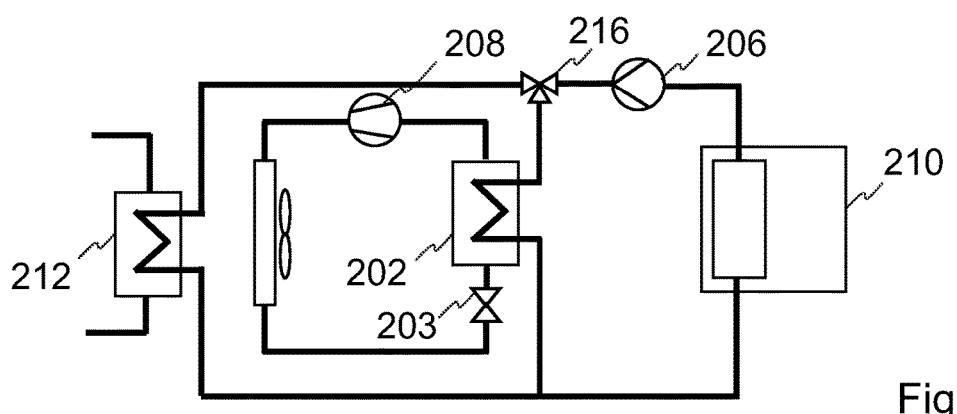

FIGS. 2a and 2b illustrate refrigerant circuits according to embodiments. The refrigerant circuits may be the refrigerant circuits of the charging station and the vehicle described in FIG. 1. In FIG. 2a the refrigerant circuits are connected in series. In FIG. 2b, the refrigerant circuits are connected in parallel by a three-way valve 216. The parallel and series connection of the refrigerant circuits provide that the refrigerant circuit of the vehicle and the charging station are both connected to a fluid-fluid heat exchanger 202 such that refrigerant from the circuits may flow to the fluid-fluid heat exchanger. Preferably, the refrigerant circuits are connected to the fluid-fluid heat exchanger during charging of the battery 210 of the vehicle such that the refrigerant from the refrigerant circuit of the charging station may cool down the battery.

It should be appreciated that when the battery is not charged the refrigerant circuit of the charging station or the refrigerant circuit of the vehicle may be disconnected from the fluid-fluid heat exchanger such that the vehicle may be moved away from the charging station.

In the following description of FIGS. 2a and 2b the refrigerant circuits are described assuming that the fluid-fluid heat exchanger is on-board the vehicle, as a part of the refrigerant circuit of the vehicle. However, in an embodiment the fluid-fluid heat exchanger may be located in the charging station as a part of the refrigerant circuit of the charging station.

The refrigerant circuits of the vehicle and the charging station comprise fluid lines that contain refrigerant that is moved by a pump 206 or a compressor 208 in the fluid lines.

The refrigerant circuit of the vehicle may have a battery cooler 204. The battery cooler may be positioned within the battery such that heat may be conducted from the battery to the refrigerant within the fluid lines of the refrigerant circuit. The battery cooler may transfer heat from the battery, when the refrigerant circuit of the vehicle is not connected to the refrigerant circuit of the charging station, for example during driving of the vehicle. The fluid lines may feed the refrigerant inside the battery, where the refrigerant is passed between refrigeration plates inside the battery. The refrigeration plates inside the battery act as a heat sink. Refrigerant heated by the battery is directed to the battery cooler for transferring heat from the refrigerant. The battery cooler may be a heat pump for example.

The refrigerant circuit of the charging station can include a cooling system. Preferably, the refrigeration power of the refrigerant circuit of the charging station is greater than the refrigeration power of the vehicle's refrigerant circuit. The refrigerant circuit may be arranged to reach the cooling power by designing the components of the refrigerant circuit, e.g. the cooling system, fluid lines and the refrigerant to meet desired cooling power that is greater than the cooling power of the vehicle's refrigerant circuit. In one example, the cooling system may have a greater cooling power than the battery cooler.

The refrigerants used in the refrigerant circuits may be different or of the same type. The cooling system can have a water supply line of a mine or the cooling system may be a part of a water supply line of a mine. In this way, water from the water supply line of the mine may be used to cool down the battery during charging of the battery. After the water has been used to cool down the battery, for example, after the water has passed the fluid-fluid heat exchanger, the water may be fed to a sewerage system. Alternatively or additionally, the water may be directed after the fluid-fluid heat exchanger to a water system of the vehicle, e.g. a mining machine.

In the water system of the mining machine the water may be used for flushing drilling holes and for removing or tying down dust, which may be particularly useful in continuous mining machines. The charging station, vehicle and sewerage system and their refrigerant circuits may be provided with appropriate connections, valves and/or piping for directing water from the fluid-fluid heat exchanger.

In one embodiment, water from a water system of the vehicle, for example the mining machine, may be used to enhance cooling of the battery. The water system may be used in the mining machine for supplying water to one or more mining operations. Examples of the mining operations include drilling, for example. The water system may be used for flushing drilling holes and for removing or tying down dust, for example. The water from the water system of the mining machine may be fed to the refrigerant circuit of the mining machine for cooling down the battery continuously or at times, when the battery is operated at a high power. The battery may be operated at a high power, when the battery supplies a substantial part of the power, for example, a drilling power, needed by the mining machine, or the battery is used for buffering input power of the mining machine.

In another embodiment, flow of the refrigerant in the cooling system of refrigerant circuit of the charging station may be controlled. The cooling system may have, for example, an evaporator 212 and optionally a condenser (not shown). The evaporator can cool down refrigerant from the fluid lines by air moving through the evaporator. The condenser may receive refrigerant in gas phase from the fluid lines. In the condenser, the refrigerant is cooled down and converted to liquid phase. From the condenser the refrigerant may be fed back to the fluid lines.

The refrigerant may be controlled to flow through the evaporator, when the refrigerant circuits of the vehicle and the charging station are not connected, and the refrigerant may be controlled to flow through the fluid-fluid heat exchanger, when the refrigerant circuits are connected via the fluid-fluid heat exchanger.

The fluid-fluid heat exchanger may be connected the fluid lines behind a valve 203 such that flow of the refrigerant through the fluid-fluid heat exchanger may be controlled, for example switched on or off. The evaporator may be connected to the fluid lines behind a valve 213 such that flow of the refrigerant through the evaporator may be controlled, for example switched on or off. The valves may be located in upstream direction from the fluid-fluid heat exchanger and/or the evaporator. The upstream direction may refer to a direction against the flow of the refrigerant.

In one example, flow of the refrigerant may be controlled such that the flow of the refrigerant through the fluid-fluid heat exchanger 202 may be switched off, when the refrigerant circuits of the vehicle and the charging station are not connected. The refrigerant circuits are not connected, for example, when the vehicle is not positioned at the charging station for charging the battery. When the battery is not charged, the vehicle may be moving as powered by the stored energy discharging from the battery. Accordingly, when the refrigerant circuits are not connected, the refrigerant circuit of the charging station may circulate the refrigerant via the evaporator 212 and the condenser to cool down the refrigerant. In this way, the refrigerant may be cooled down between charging operations of batteries, which may be charging operations of the same battery or charging operations of different batteries. Accordingly, when the flow of the refrigerant through the fluid-fluid heat exchanger is switched off, the flow of the refrigerant through the evaporator may be switched on.

In one example, flow of the refrigerant may be controlled such that the flow of the refrigerant through the evaporator 212 may be switched off, when the vehicle is positioned at the charging station for charging the battery and the refrigerant circuits of the vehicle and the charging station are connected. When the refrigerant circuits are connected the refrigerant circuit of the charging station may circulate the refrigerant via the fluid-fluid heat exchanger 202 and the condenser to cool down the refrigerant. Accordingly, when the flow of the refrigerant through the evaporator is switched off, the flow of the refrigerant through the fluid-fluid heat exchanger may be switched on.

In an embodiment, flow of the refrigerant in the cooling system of vehicle may be controlled. The refrigerant of the refrigerant circuit of the vehicle may be directed via the fluid-fluid heat exchanger, when the refrigerant circuit of the vehicle and the refrigerant circuit of the charging station are connected, for example during charging of the battery. On the other hand, when the refrigerant circuits are not connected the refrigerant of the refrigerant circuit of the vehicle may be directed to the battery cooler. The controlling may be provided by the three-way valve 216.

In an embodiment, refrigerant of the refrigerant circuit of the vehicle may be directed via the fluid-fluid heat exchanger from different portions of the refrigerant circuit of the vehicle. One of the portions may comprise the battery 210 and the other portion may comprise the battery cooler 204. The three-way valve may be used to direct the flow of refrigerant from the battery or battery cooler to the fluid-fluid heat exchanger. The refrigerant circuits of the vehicle and the charging station are connected, e.g. during the battery is charged, in order to cool down the refrigerant flowing through the fluid-fluid heat exchanger.

In an embodiment, during charging of the battery refrigerant from the refrigerant circuit comprising the battery may be directed via the fluid-fluid heat exchanger and after the battery is charged, refrigerant from the portion of the refrigerant circuit comprising the battery cooler may be directed via the fluid-fluid heat exchanger. In this way the battery cooler may be cooled down before the refrigerant circuits are disconnected and the vehicle is moved away from the charging station to perform its tasks.

An embodiment of an apparatus, for example, a mining machine or a charging station, can have at least one processor, memory and a computer program code, wherein the at least one memory and the computer program code are configured to, with the at least one processor, cause the apparatus to perform one or more functions or steps of an embodiment.

One or more functions described in the embodiments above and related to for example control of refrigerant in one or more refrigerant circuits may be implemented by control valves, e.g. two or three-way valves, that are electronically or manually controlled. One or more valves may be controlled by a common controller or the valves may be controlled by separate controllers. A controller may refer to a processor. The processor may be connected to a memory and a communications part electrically. The memory may store computer program code that when executed by the processor causes performing one or more functions or steps of an embodiment.

The communications part may be a an electrical interface, connector or a communications module that is capable of obtaining electrical signals, commands and/or messages from the processor to one or more control valves. The communications may comprise digital or analogue communications. The communications may be wired or wireless communications. The communications may be implemented by various communications protocols and technologies, for example Ethernet, IEEE 802.11 based Wireless Local Area Network, Internet Protocol, Hart and Profibus. One or more sensors may be connected to the communications part such that data from the sensors may be used to in controlling the valves.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

The processor may be a computer processor, application-specific integrated circuit (ASIC), field-programmable gate array (FPGA), and/or any other hardware component that has been programmed in such a way to carry out one or more functions of an embodiment.

The memory may include volatile and/or non-volatile memory and typically stores content, data, or the like. For example, the memory may store computer program code such as software applications or operating systems, information, data, content, or the like for the processor to perform steps associated with operation of the apparatus in accordance with embodiments. In the illustrated embodiment, the memory may be, for example, random access memory (RAM), a hard drive, or other fixed data memory or storage device. Further, the memory, or part of it, may be removable memory detachably connected to the control unit.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A mining machine comprising:
a battery arranged to store electrical energy;
a refrigerant circuit for circulating a refrigerant via the battery, the refrigerant circuit having a first and second portion;
a connection for connecting the refrigerant circuit to a refrigerant circuit of a charging station via a fluid-fluid heat exchanger; and
a water system for mining operations, wherein during charging of the battery refrigerant from the first portion of the refrigerant circuit of the mining machine is directed via the fluid-fluid heat exchanger and after the battery is charged, refrigerant from the second portion of the refrigerant circuit of the mining machine is directed via the fluid-fluid heat exchanger, and that the water from the water system for mining operations is fed to the refrigerant circuit of the mining machine for cooling down the battery.

2. The mining machine according to claim 1, wherein the mining machine includes the fluid-fluid heat exchanger and the fluid-fluid heat exchanger is arranged to be connected to the refrigerant circuit of the charging station for transferring heat between the refrigerant circuit of the mining machine and the refrigerant circuit of the charging station when the refrigerant circuits are connected via the fluid-fluid heat exchanger.

3. The mining machine according to claim 1, wherein during charging of the battery, the refrigerant of the refrigerant circuit of the mining machine is directed via the fluid-fluid heat exchanger for transferring heat from the battery to the refrigerant circuit of the charging station connected to the fluid-fluid heat exchanger.

4. The mining machine according to claim 1, wherein the battery is cooled by a battery cooler of the refrigerant circuit of the mining machine, when power stored to the battery is consumed by the mining machine.

5. The mining machine to claim 4, wherein the refrigerant of the refrigerant circuit of the mining machine is directed via the fluid-fluid heat exchanger from at least one portion of the refrigerant circuit of the mining machine, the first portion of the refrigerant circuit of the mining machine including the battery and the second portion of the refrigerant circuit of the mining machine including the battery cooler when the refrigerant circuit of the charging station is connected to the fluid-fluid heat exchanger.

6. The mining machine according to claim 1, wherein the water system is connected to the refrigerant circuit of the mining machine such that water from the water system for mining operations is fed to the refrigerant circuit of the mining machine for cooling down the battery continuously or at times, when the battery is operated at a high power such that a substantial part of the power needed by the mining machine is supplied by the battery, or the battery is used for buffering input power of the mining machine.

7. The mining machine according to claim 1, wherein the battery is a lithium-ion battery.

8. The mining machine according to claim 6, wherein the high power is a drilling power.

9. A charging station comprising:
an electrical outlet for charging a battery with electrical energy;
a refrigerant circuit for circulating a refrigerant via the battery, the refrigerant circuit having a first and second portion;
a connection for connecting the refrigerant circuit via a fluid-fluid heat exchanger to another refrigerant circuit connected to the battery of the mining machine, the fluid-fluid heat exchanger being located in one of either the charging station or in the mining machine, such that during charging of the battery via the electrical outlet, refrigerant from the refrigerant circuit of the charging station is circulated via the fluid-fluid heat exchanger for transferring heat between the refrigerant circuit connected to the battery of the mining machine and the refrigerant circuit of the charging station when the refrigerant circuits are connected via the fluid-fluid heat exchanger; and
a water system for mining operations, wherein during charging of the battery refrigerant from the first portion of the refrigerant circuit of the mining machine is directed via the fluid-fluid heat exchanger and after the battery is charged, refrigerant from the second portion of the refrigerant circuit of the mining machine is directed via the fluid-fluid heat exchanger, and that the water from the water system for mining operations is fed to the refrigerant circuit of the mining machine for cooling down the battery.

10. The charging station according to claim 9, wherein the refrigerant circuit of the charging station includes an evaporator, wherein the refrigerant in the refrigerant circuit of the charging station is controlled to flow through the evaporator, when the refrigerant circuits are not connected via the fluid-fluid heat exchanger, and the refrigerant in the refrigerant circuit of the charging station is controlled to flow through the fluid-fluid heat exchanger, when the refrigerant circuits are connected via the fluid-fluid heat exchanger.

11. The charging station according to claim 10, wherein the refrigerant circuit of the charging station is connected to a water supply line in a mine.

12. The charging station according to claim 10, wherein the refrigerant circuit of the charging station is part of a water supply line in a mine.

* * * * *